INVENTOR.
JOHN V. EAKIN

INVENTOR.
JOHN V. EAKIN

BY Ely, Golrick + Flynn

ATTORNEYS

United States Patent Office 3,362,513
Patented Jan. 9, 1968

3,362,513
CLUTCH WITH AIR COMPRESSOR
DISPOSED THEREIN
John V. Eakin, Rocky River, Ohio, assignor to Fawick
Corporation, a corporation of Michigan
Filed Nov. 17, 1965, Ser. No. 508,330
10 Claims. (Cl. 192—88)

ABSTRACT OF THE DISCLOSURE

This self-charging pneumatic clutch assembly has an air storage cavity in a radially disposed end wall of the clutch structure which carries a diaphragm that is inflatable by pressurized air to engage the clutch. This one clutch structure carries an air compressor, completely disposed within the axial length of the clutch and driven by a motor mounted stationary outside the clutch. A pressure switch senses the pressure in the air cavity and turns on the motor to drive the compressor when the air cavity pressure is low. A solenoid valve is selectively controlled by switches to either (1) pass air from this cavity into the diaphragm to engage the clutch, or (2) vent the diaphragm to the atmosphere to release the clutch.

---

This invention relates to a self-charging pneumatic clutch assembly.

Pneumatically-operated clutches (for example, of the type shown in United States Letters Patent No. 2,870,891) require a source of pressurized air and also a suitable passage arrangement connecting the clutch to the air source. Commonly, the air source has been an air compressor mounted stationary at some distance from the clutch itself and connected through a rotating seal to air passages leading into the inflatable part of the clutch. In certain types of installations, however, particularly shipboard installations, it is not possible in many cases to admit air through rotating seals of the general type just mentioned.

The present invention is directed to a novel arrangement which overcomes this difficulty by providing a novel air supply arrangement on the clutch itself which minimizes the size of the clutch and air supply assembly and simplifies its pneumatic connections. The present arrangement has novel provision for automatically maintaining a pressurized air supply in immediate proximity to the inflatable part of the clutch, enabling the clutch to be quickly engaged whenever desired. The present arrangement also provides a novel and simplified electrical control for the air supply and for the clutch proper.

It is a principal object of this invention to provide a novel and improved pneumatic clutch assembly which includes an air supply for the clutch itself.

Another object of this invention is to provide such a clutch assembly having novel provision for maintaining a supply of pressurized air at the proper pressure in immediate proximity to the inflatable part of the clutch itself.

Further objects and advantages of this invention will be apparent from the following detailed description of a presently-preferred embodiments, which is illustrated in the accompanying drawings.

Figure 1:
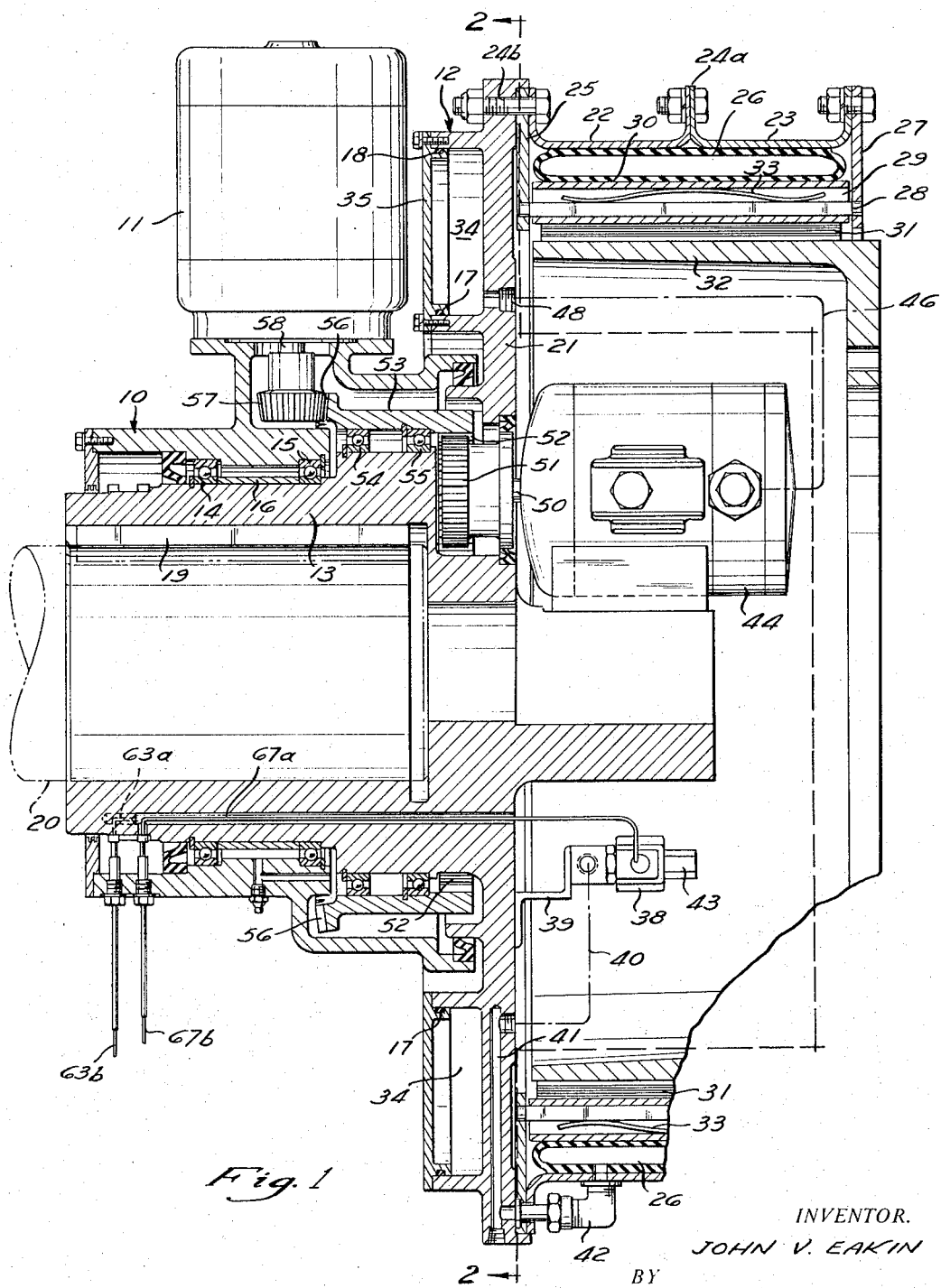
FIGURE 1 is a longitudinal sectional view of the present clutch assembly, taken along the line 1—1 in FIG. 2.

Referring first to FIG. 1, the embodiment of the present invention illustrated there has a rigid, stationary, annular support 10 which fixedly supports an electric motor 11. In the present assembly the clutch itself is of known construction, preferably substantially in accordance with United States Letters Patent No. 2,870,891 to John V. Eakin et al. It includes a first rotatable clutch structure 12 having an integral, axially projecting, annular hub 13, which is rotatably mounted in the stationary support 10 by a pair of ball bearings 14, 15, which are separated by a thrust sleeve 16. This hub 13 of the first rotatable clutch structure 12 is connected by a key 19 to a drive shaft, shown in phantom at 20.

At the inner end of its hub 13, the first rotatable clutch structure 12 has an integral, annular, radially outwardly projecting end wall 21. A pair of rigid rings 22, 23, bolted end-to-end at 24a, are rigidly bolted to the end wall 21 at 24b. A first rigid end plate 25 is engaged between the end wall 21 and the adjacent end of ring 22. The rings 22, 23 rigidly support a hollow, fluid-distensible, resilient, annular diaphragm or torque bag 26 of known construction. Preferably, this diaphragm has an outer hollow annulus and an inner tube, both of cord-reinforced, vulcanized soft rubber or other rubber-like material of suitable deformability and resiliency. The outside of this diaphragm is vulcanized to the inside of the rings 22, 23. A second rigid end plate 27 is bolted to ring 23 at the opposite axial end of the diaphragm 26 from the first end plate 25.

A plurality of torque-transmitting bars 28 extend axially between the end plates 25, 27 at circumferentially spaced locations around the inside of the diaphragm 26. These torque bars extend through longitudinal openings 29 in respective arcuate wear shoes 30, which are closely positioned in succession circumferentially around the inside of the diaphragm 26. These wear shoes carry wear pads 31 of friction material at the inside. A leaf spring 33 is engaged under compression between each torque bar 28 and the respective wear shoe 30 to bias the latter radially outward.

The second rotatable clutch structure is a rigid drum 32 disposed radially inward from the fluid-distensible diaphragm 26 and the wear shoes 30 associated with the latter. This drum is adapted to be connected to an engine flywheel (not shown) or other rotatable driven member having its rotational axis substantially aligned with that of shaft 20.

When the diaphragm 26 is inflated with air under pressure, it forces the wear shoes 30 radially inward to bring their wear pads 31 into frictional, torque sustaining engagement with the outside of the drum 32, so as to impart rotation from the drive shaft 20 and the first rotatable clutch structure 12 to the drum 32. When the air pressure is vented from the diaphragm, the springs 33 return the wear shoes 30 radially outward to disengage their wear pads 31 from the drum.

In accordance with the present invention, the first rotatable clutch structure has, in immediate proximity to the inflatable diaphragm 26, an air cavity for storing pressurized air. In the illustrated embodiment this air cavity is provided by an annular chamber 34 formed in the end wall 21 and a cover plate 35 bolted to the outside of this end wall and sealed to the latter by O-rings 17 and 18.

Figure 2:
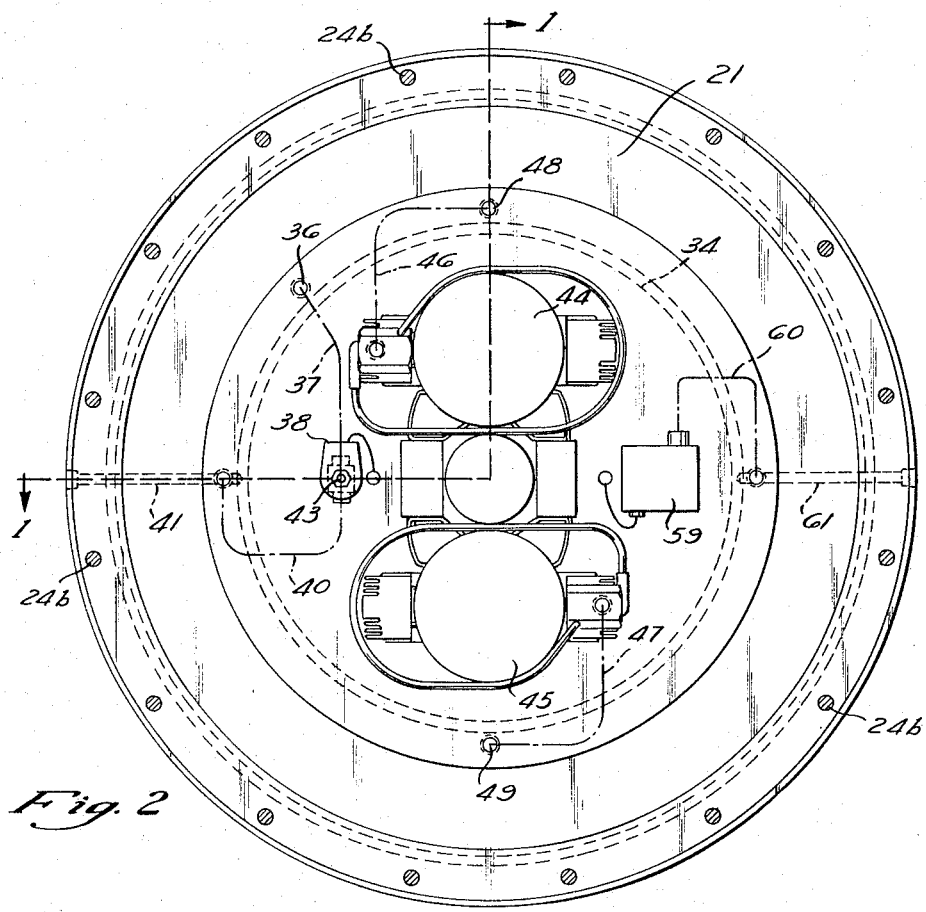
FIGURE 2 is an end elevational view taken along the line 2—2 in FIG. 1.

Referring to FIG. 2, this air cavity 34 has an opening 36, which is connected by an air line 37 to one port of a three-way solenoid valve 38. As shown in FIG. 1, this solenoid valve is attached to the axially inboard face of the end wall 21 of the first rotatable clutch structure 12 by a bracket 39.

Referring to FIG. 2, a second port of valve 38 is connected by an air line 40 to the inner end of a radial passage 41 in the end wall 21. A suitable fitting 42 (FIG. 1) connects the outer end of this passage to the interior of the inflatable clutch diaphragm 26.

With this arrangement, when the solenoid valve 38 is operated to connect line 37 to line 40, pressurized air stored in the air cavity 34 in the end wall 21 of the first rotatable clutch structure 12 can flow from that cavity through line 37, valve 38, line 40, passage 41 and fitting 42 into the diaphragm 26 to inflate the diaphragm and thereby engage the clutch.

The solenoid valve 38 also has an exhaust port 43 which is open to the atmosphere. When the clutch is disengaged, valve 38 connects line 40 to this exhaust port 43 so as to vent the air from the diaphragm 26.

In accordance with the present invention suitable air compressor means is rigidly mounted on the first rotatable clutch structure 12 for rotation in unison with the latter. In the particular embodiment illustrated, this air compressor means comprises two air compressor 44 and 45 (FIG. 2) both of conventional design and both suitably mounted rigidly on the first rotatable clutch structure 12 at the axially inboard side of the latter's end wall 21 and within, and spaced from, the drum 32. These compressors have respective output lines 46 and 47 connected to ports 48 and 49 in the end wall 21 leading into the air cavity 34.

As shown in FIG. 1, the air compressor 44 has a rotatable input shaft 50 carrying a small pinion 51. This pinion meshes with the internal teeth 52 on one end of a much larger ring gear body 53. This ring gear body 53 is rotatably supported on the outside of the hub 13 of the first rotatable coupling structure 12 by a pair of ball bearings 54 and 55.

The other air compressor 45 has a similar pinion (not shown) which meshes with the internal gear teeth 52 on the ring gear body 53 at a location on the latter diametrically opposite where the pinion 51 engages it.

At its left end in FIG. 1, the ring gear body 53 has an axially-facing bevel gear 56 in meshing engagement with a bevel pinion 57 on the output shaft 58 of motor 11.

When the motor is energized, its output shaft 58 and pinion 57 rotate at high speed, driving the ring gear body 53 at a much lower rotational speed. The internal gear teeth 52 on this ring gear body drive the compressor pinions at relatively high speed to operate the respective compressors 44 and 45.

Referring to FIG. 2, the present invention also includes a pressure switch 59 of conventional design, which is rigidly attached to the axially inboard face of the end wall 21 of the first rotatable clutch structure 12. This switch 59 is provided with an air pressure line 60 which is connected to the inward end of a radial passage 61 in the end wall 21 similar to the previously described passage 41. The outer end of this passage 61 is connected through a suitable fitting (not shown) to the interior of the air cavity 34. With this arrangement the pressure switch 59 is controlled at all times in response to the air pressure in the air cavity 34.

Figure 3:
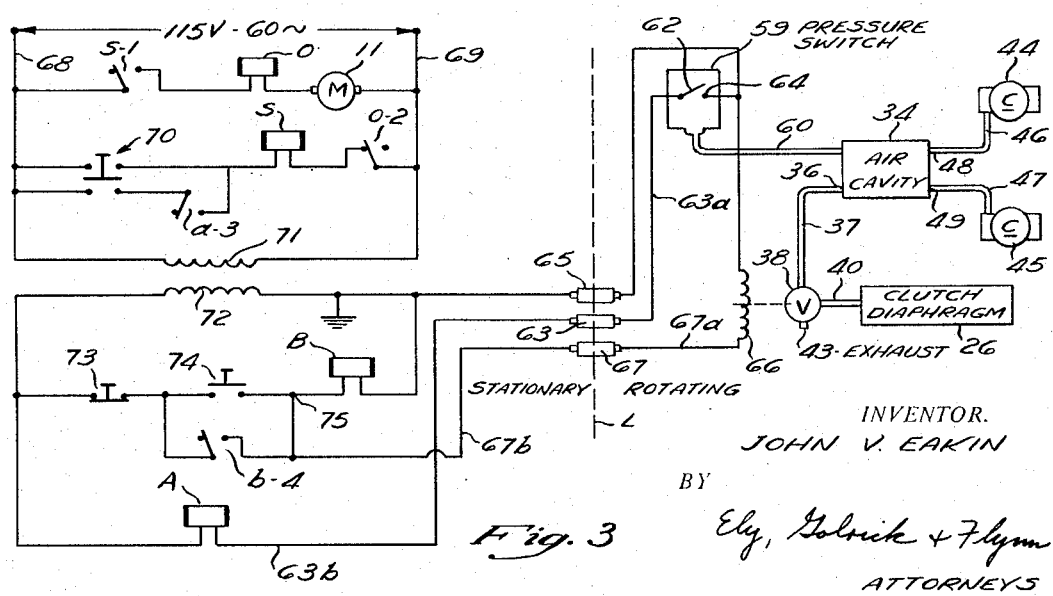
FIGURE 3 is a schematic circuit diagram showing the pneumatic circuit and the electrical control circuit in the present clutch assembly.

Referring to FIG. 3, which illustrates schematically the electrical and pneumatic systems in the present invention, everything to the right of the dashed-line L is mounted for rotation in unison with shaft 20 and the first rotatable clutch structure 12. The mobile contact 62 of pressure switch 59 is connected by a wire 63a to a first collector ring 63. The fixed contact 64 of pressure switch 59 is connected to a second collector ring 65, which is grounded. The solenoid 66 of solenoid valve 38 is connected between the grounded second collector ring 65 and a wire 67a connected to a third collector ring 67. In addition to the pressure switch 59 and the solenoid valve 38, the rotating assembly includes the air compressors 44, 45, the air cavity 34, and the clutch diaphragm 26, all illustrated schematically by blocks in FIG. 3 and having the numbered air line connection already described with reference to FIGS. 1 and 2.

The stationary electrical control circuit, to the left of line L in FIG. 3, includes a pair of power supply lines 68 and 69 connected across a suitable 115 volt, 60 cycle per second power supply.

The electric motor 11 is connected across these power supply lines in series with an overload relay coil O and the normally-open contacts s–1 of a start relay S.

The coil of relay S is connected across the power supply lines 68, 69 in series with the upper set of fixed contacts of a manually-operable, double-pole, double-throw switch 70 and the normally-closed contacts o–2 of the overload relay. Switch 70 has a lower set of fixed contacts connected in series with the normally-open contacts a–3 of a switch relay A between line 68 and the coil of relay S. When it is desired to start the compressors manually, irrespective of the air pressure in the air cavity 34, the upper contacts of switch 70 are closed. However, normally the lower contacts of switch 70 will be closed, so that the compressors will be under the control of the pressure switch 59, as described hereinafter.

The primary winding 71 of a 115 volt-to-24 volt step-down transformer is connected across power supply lines 68 and 69.

The secondary winding 72 of this transformer has its right end grounded.

The left end of the transformer secondary 72 is connected to one side of the coil of relay A, the opposite side of this relay coil being connected by a wire 63b to the first collector ring 63.

The coil of a clutch relay B is connected across the transformer secondary 72 in series with a pair of manually-operated switches 73 and 74. Switch 73 is a normally-closed "off" switch, whereas switch 74 is a normally-open "on" switch.

A set of holding contacts b–4 for clutch relay B is connected across the "on" switch 74.

The third collector ring 67 is connected by a wire 67b to the junction point 75 of contacts b–4, switch 74, and relay coil B.

For automatic operation of this control system, switch 70 is set with its lower contacts closed. The pressure switch 59 senses the air pressure in the air cavity 34, and if this pressure is below a predetermined value the pressure switch contacts 62, 64 close. This completes an energization circuit for relay coil A across the transformer secondary 72. The energization of relay A closes its contacts a–3 to complete an energization circuit for the coil of relay S by way of power supply line 68, the now-closed lower contacts of switch 70, the now-closed relay contacts a–3, and the normally-closed overload relay contacts o–2, to the opposite power supply line 69.

When the coil of relay S is thus energized, its contacts s–1 close, completing an energization circuit for motor 11 and the coil of overload relay O. The motor 11 will now drive the air compressors 44, 45 until the air pressure in air cavity 34 has been increased to a value effective for operating the clutch. When this air pressure value is reached in the air cavity 34, the pressure switch 59 will open, thereby de-energizing relays A and S and the motor 11.

Throughout the time just described, the solenoid 66 of solenoid valve 38 remains de-energized, and valve 38 connects the clutch diaphragm 26 to the exhaust port 43 and blocks the clutch diaphragm from the line 37 to the air cavity 34.

With the "off" switch 73 in its normally-closed position, the operator may now engage the clutch at any time by closing the "on" switch 74. This completes an energization circuit for the valve solenoid 66 across the transformer secondary 72 by way of switches 73 and 74 and the collector rings 65 and 67.

The closing of switch 74 also completes an energization circuit for the coil of relay B, which is connected in parallel with the valve solenoid 66 across the collector rings 65 and 67. Relay B closes its holding contacts b–4, to maintain both the valve solenoid 66 and the coil of relay B energized independent of the "on" switch 74. The operator now releases the "on" switch 74, which returns to its normally-open position.

Solenoid 66, when thus energized, operates valve 38 to connect the air cavity 34 to the clutch diaphragm 26, and to block the clutch diaphragm from the exhaust port 43. The clutch diaphragm, therefore, is immediately inflated by pressurized air from the air cavity 34 to engage the clutch.

The clutch will remain engaged until the operator opens the "off" switch 73.

It will be apparent that the illustrated embodiment of this invention provides an air pressure source in immediate proximity to the inflatable clutch diaphragm and that this air pressure source is maintained at the proper operating pressure by the motor-driven compressors under the control of the pressure switch. The entire assembly of the clutch proper, the compressors, the compressor motor, the pressure switch, the solenoid valve, and the various air and electrical lines is extremely compact, particularly in an axial direction, so that this assembly may be used where there is very little space between the drive shaft and the driven member. The pneumatic and electrical circuit connections are relatively simple, the pneumatic circuit being entirely self-contained and the electrical circuit having just two wires 63b and 67b leading into the rotating assembly, as shown in FIG. 1, which makes it particularly advantageous for shipboard installations.

While a presently-preferred embodiment of this invention has been described in detail and illustrated in the accompanying drawings, it is to be understood that other structural embodiments differing in detail from the particular arrangement shown may be adopted without departing from the spirit and scope of the present invention.

I claim:

1. A self-charging pneumatic clutch assembly comprising:
    a clutch having two rotatable clutch structures and including means inflatable by pressurized air to bring the two clutch structures into torque-sustaining engagement with one another;
    air compressor means carried by one of said clutch structures;
    drive means for operating said air compressor means independent of the rotation of either of said clutch structures;
    and valve means connected between the output of said compressor means and said inflatable means and selectively operable to either pass pressurized air produced by said compressor means to said inflatable means for engaging the clutch or vent said inflatable means to the atmosphere.

2. A self-charging pneumatic clutch assembly according to claim 1 wherein:
    said two clutch structures are concentrically positioned, one inside the other;
    and said air compressor means is contained substantially within the axial confines of said two clutch structures.

3. A self-charging pneumatic clutch assembly comprising:
    a clutch having two rotatable clutch structures, one of said clutch structures including means inflatable by pressurized air to bring the clutch structures into torque-sustaining engagement with each other;
    air storage means on said one clutch structure;
    air compressor means on said one clutch structure connected to said air storage means for delivering pressurized air thereto;
    drive motor means coupled to said air compressor means for operating the latter;
    means responsive to the air pressure in said air storage means for controlling said motor to operate said air compressor means to deliver pressurized air to said air storage means when said pressure is below a predetermined value effective to operate the clutch;
    and selectively operable means for passing pressurized air from said air storage means to said inflatable means to operate the clutch.

4. A self-charging pneumatic clutch assembly according to claim 3 wherein:
    said inflatable means on said one clutch structure is a resilient, fluid-distensible, annular diaphragm;
    said air storage means is an air cavity on said one clutch structure;
    said means responsive to the air pressure in the air storage means is a pressure switch connected to sense the air pressure in said air cavity and operable thereby to cause said motor means to be energized when the air pressure in the air cavity is below said predetermined value;
    and said selectively operable means for passing pressurized air is a solenoid valve having an operating solenoid and manually operable switch means controlling the energization of said solenoid, said valve having a first position in which it vents the diaphragm to the atmosphere when the solenoid is de-energized and having a second position in which it connects the air cavity to the diaphragm when the solenoid is energized.

5. A self-charging pneumatic clutch assembly according to claim 3, wherein said drive motor means is a stationarily-mounted electric motor having a driving connection to said air compressor means.

6. A self-charging pneumatic clutch assembly according to claim 3, wherein said air compressor means is contained substantially within the axial confines of the two clutch structures.

7. A self-charging pneumatic clutch assembly according to claim 3 wherein:
    said one clutch structure has an annular central hub portion for connection to a drive shaft, a radial end wall connected integrally to said hub portion, and outer ring means attached to said end wall and projecting axially therefrom;
    said inflatable means is a resilient, fluid-distensible, annular diaphragm at the inside of said outer ring means;
    the other of said clutch structures is a clutch drum substantially concentric with said one clutch structure and spaced radially inward from said diaphragm;
    said air storage means is an air cavity in said radial end wall of said one clutch structure;
    said air compressor means is mounted on said one clutch structure within the clutch drum and is contained substantially within the axial confines of said one clutch structure and the clutch drum;
    and wherein there are provided:
        a stationary support rotatably receiving said central hub portion of said one clutch structure and fixedly supporting said motor means;
        and drive means coupling said motor means to said air compressor means.

8. A self-charging pneumatic clutch assembly according to claim 7, wherein:
    said drive means comprises a drive gear connected to said motor means, a ring gear member encircling said central hub portion of said one clutch structure and rotatable with respect to the latter, said ring gear member at one end thereof meshing with said drive gear, and an input gear for said air compressor means meshing with said ring gear member at the latter's opposite end.

9. A self-charging pneumatic clutch assembly comprising:
    a clutch having two rotatable clutch structures, one of said clutch structures including means inflatable by pressurized air to bring the clutch structures into torque-sustaining engagement with one another;
    air storage means on said one clutch structure;

air compressor means mounted on said one clutch structure for rotation in unison with the latter and having an air connection to said air storage means;

a valve having air connections to said inflatable means and said air storage means, said valve having an electrical operator, said valve and its operator being mounted on said one clutch structure for rotation in unison with the latter;

a pressure switch having an air connection to said air storage means to be responsive to the air pressure in the latter, said switch being mounted on said one clutch structure for rotation in unison with the latter;

a motor having a drive connection to said air compressor means;

a stationarily-mounted electrical control circuit for controlling the energization of said motor and said valve operator;

and rotatable contact means on said one clutch structure connecting said electrical control circuit to said pressure switch and valve operator;

said control circuit including means responsive to the operation of said pressure switch when the pressure in said air storage means is below a predetermined value to energize said motor, said control circuit also including manually operable switch means controlling the energization of said valve operator.

10. A self-charging pneumatic clutch assembly according to claim 9, wherein said motor is stationarily-mounted.

References Cited

UNITED STATES PATENTS

| | | | |
|---|---|---|---|
| 1,651,212 | 11/1927 | Linderman | 192—88 |
| 2,178,050 | 10/1939 | Peterson | 192—85 X |
| 2,538,997 | 1/1951 | Weiland | 192—85 |
| 2,868,342 | 1/1959 | Croucher | 192—85 X |
| 3,173,527 | 3/1965 | Eakin | 192—88 |

BENJAMIN W. WYCHE III, *Primary Examiner.*